United States Patent [19]
Swinford

[11] Patent Number: 6,029,720
[45] Date of Patent: Feb. 29, 2000

[54] DISPENSING TOOL ASSEMBLY FOR EVACUATING AND CHARGING A FLUID SYSTEM

[76] Inventor: Mark D. Swinford, 1001 Marycrest La., Centerville, Ohio 45429

[21] Appl. No.: 09/106,889

[22] Filed: Jun. 29, 1998

[51] Int. Cl.$^7$ .................................................. B65B 3/00
[52] U.S. Cl. .......................... 141/385; 141/59; 141/65; 141/67; 141/383; 141/21; 62/292; 137/625.66; 251/149.9; 285/315
[58] Field of Search .................................... 141/2, 3, 4, 5, 141/7, 8, 18, 20, 21, 46, 54, 59, 65, 67, 25, 27, 348, 349, 383, 384, 385, 386; 62/77, 292; 285/315, 316; 137/625.68, 625.66, 625.38, 296.18; 128/205.19, 204.25, 205.24; 251/63, 149.9

[56] References Cited

U.S. PATENT DOCUMENTS

| | | | |
|---|---|---|---|
| 4,526,406 | 7/1985 | Nelson | 285/18 |
| 4,643,228 | 2/1987 | Spencer | 137/625.66 |
| 4,664,151 | 5/1987 | Piet | 137/625.66 |
| 4,805,417 | 2/1989 | Weaver et al. | 62/292 |
| 4,869,300 | 9/1989 | Gudenau et al. | 141/59 |
| 4,889,149 | 12/1989 | Weaver et al. | 137/1 |
| 5,560,407 | 10/1996 | Swinford | 141/385 |
| 5,704,383 | 1/1998 | Kammeraad et al. | 137/15 |

*Primary Examiner*—Steven O. Douglas
*Assistant Examiner*—Peter deVore
*Attorney, Agent, or Firm*—Biebel & French

[57] ABSTRACT

A generally oval upper body supports a generally cylindrical lower body comprising an outlet tube on which is mounted an inner piston containing an annular resilient sealing member adapted to be connected to the tubular inlet fitting of a liquid coolant system. The lower body supports a set of arcuate collar sections which are cammed inwardly for gripping external threads on the inlet fitting in response to axial movement of an outer air actuated annular piston surrounding the outlet tube. The sealing member is compressed axially into the upper face of the inlet fitting in response to axial movement of the inner air actuated annular piston confined between the outlet tube and the outer piston. A tubular valve member comprising an integral air actuated annular piston is supported for axial movement within the upper body in alignment with the outlet tube for selectively connecting the passage within the outlet tube to a suction passage for evacuating the coolant system and then to a fluid supply passage for filling the system. A streamlined obturator mounted in the upper body is aligned axially with the outlet tube and comprises arcuate passageways for flow of the fluid following connection of the valve member to the outlet tube.

20 Claims, 3 Drawing Sheets

DISPENSING TOOL ASSEMBLY FOR EVACUATING AND CHARGING A FLUID SYSTEM

FIELD OF THE INVENTION

The present invention relates to a tool used to evacuate and charge a fluid system.

BACKGROUND OF THE INVENTION

The present invention relates to a tool assembly constructed for evacuating and charging a fluid receiving system such as a liquid coolant system for an internal combustion engine. This tool assembly is adapted to be connected to an inlet fitting for a radiator of an engine coolant system in place of the radiator cap for first evacuating air and moisture from the system and then charging the system with a predetermined volume of liquid coolant. This invention is an improvement of the dispensing tool assembly disclosed in U.S. Pat. No. 5,560,407 invented by the applicant of the present invention. The improvement of the present invention pertains to an increase in fluid charging flow rate, elimination of sealing member to inlet fitting sticking, and protection of the tool outlet tube during handling.

SUMMARY OF THE INVENTION

The present invention is directed to a further improved dispensing tool assembly which is ideally suited for evacuating and charging a liquid receiving system such as a coolant system having a tubular inlet fitting with external threads for receiving an internally threaded closure or cap. The dispensing tool offers a reduction in the number of essential components and features a new valving method to control evacuation and charging. Positive gripping of the tubular inlet is accomplished via a set of arcuate collar sections, which grip the threaded exterior of the inlet fitting in response to axial movement of the air operated outer piston. Sealing of the inlet fitting is accomplished by a resilient seal forming a face seal with the top end of the inlet fitting.

In accordance with one embodiment of the invention, a dispensing tool assembly is formed in three primary sections; a separable manifold for connecting hose fittings to the tool assembly having a generally oval shape, an upper body containing the valving means used to switch between evacuation and charging modes also having a generally oval shape, and a lower body containing the gripping and sealing means and having a generally cylindrical shape.

A primary consideration of the present invention is to increase the charging rate of the fluid over the previous invention ('407 patent). The fluid charging rate of the previous invention can be improved by streamlining the fluid passageway and aligning it with the outlet tube. This is accomplished by the introduction of a streamlined obturator to which the valve in the upper body contacts. This obturator alternately blocks the flow of fluid and allows the fluid to flow in a generally axial direction through the tool. Flow turning of the fluid, which would otherwise create a large pressure drop, is minimized by directing the flow in a nearly axial direction around the obturator. In one embodiment the obturator contains four arcuate passageways at its periphery with a combined cross-sectional area slightly greater than that for the inner diameter of the tubular valve. The increase in cross-sectional area at the obturator passageways offsets the pressure drop imposed by the slight turning of the fluid flow. Whereas in the '407 patent the tubular valve moved away from the lower body (upward) to allow fluid to flow through the tool, the present invention forces the tubular valve to move toward the lower body (downward) and away from the obturator, thereby permitting the fluid to flow through the passageways and around the obturator.

The invention also differs form the '407 patent in that the jaws do not surround the resilient annular sealing member, as this seal member is now contained within the bottom end of the inner air actuated piston. The benefit of relocating the seal from the outlet tube of the tool to the inner piston is two-fold; first it allows the inner wall of the outlet tube to grow in diameter which promotes an increased fluid charging rate due to the increase in cross-sectional area, and second, it prevents the inadvertent sticking of the seal to the inner wall of the inlet fitting following release of the clamping collars. In the '407 patent the seal expands radially outward to contact the inner surface of the inlet fitting. This seal may stick to the inlet wall when the clamping pressure is relieved, due to the time required to evacuate and charge the coolant system and the resulting set of the seal. In the present invention this possibility is eliminated as the resilient seal is compressed axially forming a face seal. This improvement has particular benefit for automatic retraction of the tool in an assembly line mode.

The outlet tube of the tool disclosed in the '407 patent can be bent by rough handling, which degrades the smooth movement of the inner and outer clamping pistons. The risk of damage to the tool is due to the fact that the outlet tube extends from beyond the protective confine of the lower body. The tool of the present invention has an outlet tube of decreased length and one which is fully protected by the lower body. The shorter length of the present invention's outlet tube increases the range of angulation of the tool about the inlet fitting, which has importance during automatic removal of the tool. This outlet tube may also be constructed of more lightweight materials, such as aluminum, since the importance of strength is lessened.

Figure 2:
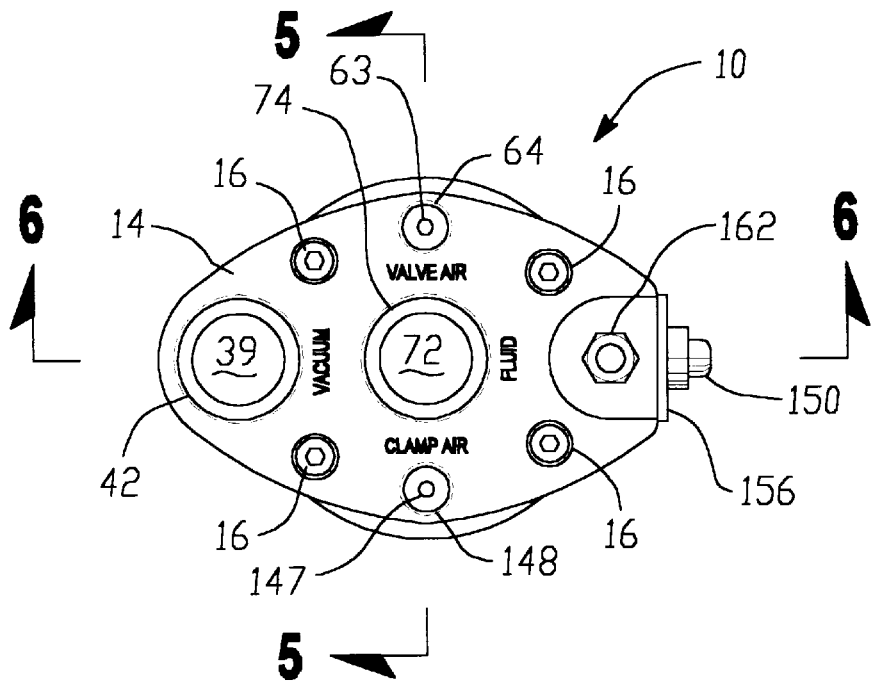
FIG. 2 is a top view of the tool assembly shown in FIG. 1.

| REFERENCE NUMERALS IN DRAWINGS |
| --- |
| 10 Tool Assembly |
| 11 Obturator |
| 12 Upper Body |
| 13 Obturator Arcuate Passageway(s) |
| 14 Manifold |
| 15 Obturator Spoke(s) |
| 16 Manifold Screw(s) |
| 17 Clamping Ring |
| 18 Closure Member |
| 21 Closure Member Screw(s) |

-continued

REFERENCE NUMERALS IN DRAWINGS

24 Outlet Tube
26 Outlet Passage
27 Lock Ring
28 Lock ring Screw(s)
29 Cylindrical Bore
32 Valve Member
33 Integral Piston
34 Fluid Passage
35 Valve Top End
36 Valve Bottom End
39 Suction Passage
42 Threaded Suction Port
53 Cylindrical Chamber
56 Compression Spring (Valve)
63 Air Passage (Valve)
64 Air Port (Valve)
67 Plug
72 Fluid Supply Passage
74 Threaded Fluid Port
75 Obturator Tapered Surface(s)
83 Manifold Tapered Surface
85 Body Tapered Surface
92 Lower Body
94 Upper Flange (Lower Body)
97 Lower Flange (Lower Body)
102 Resilient Sealing Member
105 Sealing Member Lower End
106 Inner Piston
107 Cavity (Inner Piston)
110 Outer Piston
111 Outer Chamber
112 Inner Chamber
114 Bleed Air Ports
120 Arcuate Collar Sections
122 Collar Internal Thread
124 Collar Tapered Outer Surface
127 Outer Piston Tapered surface
129 Spring Chamber
132 Expansion Spring
135 Compression Spring (Clamp)
136 Annular Washer
140 Inlet Fitting
142 Fitting External Threads
143 Fitting Upper Surface
147 Air Passage (Clamp)
148 Air Port (Clamp)
150 Start Button
152 Reset Button
154 Rectangular Chamber
156 Plate
158 Button Attach Screw(s)
160 Electrical Cable
162 Electrical Connector

DETAILED DESCRIPTION OF THE INVENTION

All black dots shown in the cross-section views represent resilient o-ring used to form fluid-tight seals between adjacent components. In describing components or features of components, the terms "upper" and "lower" mean most distant from the inlet fitting and most near to the inlet fitting respectively.

Figure 1:
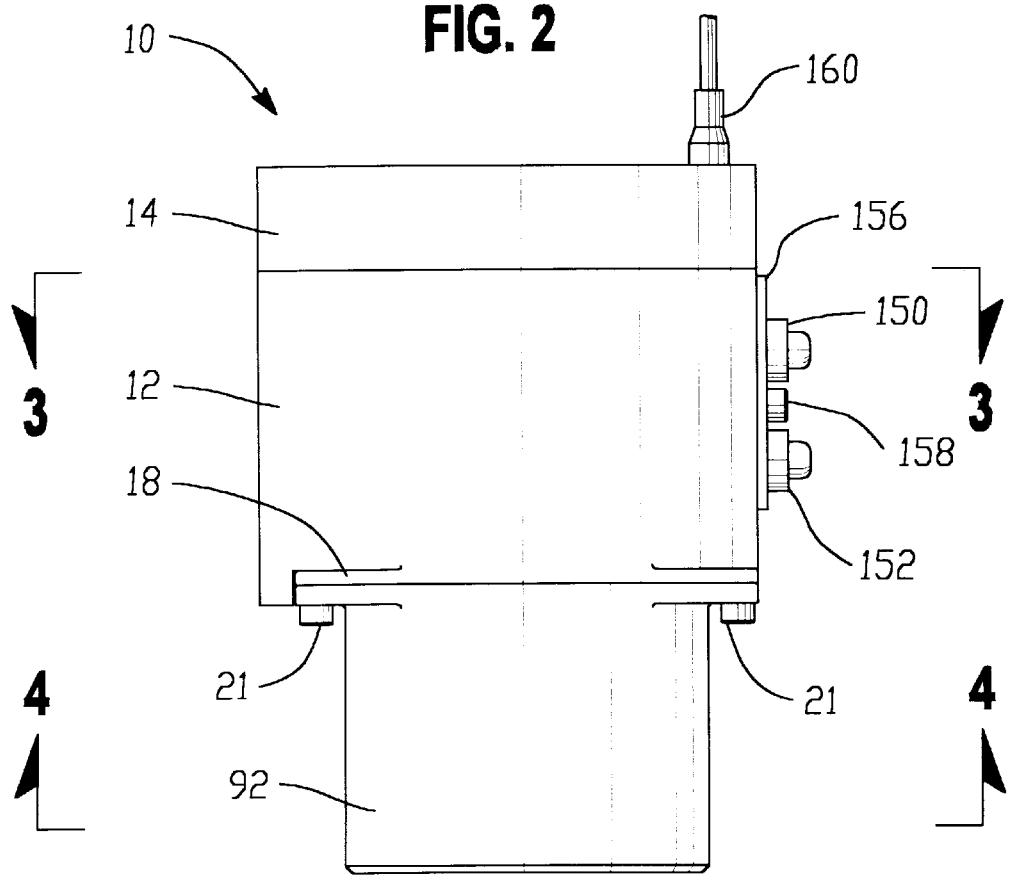
FIG. 1 is an elevational view of a dispensing tool assembly constructed in accordance with the invention.

FIGS. 1–2 depict a dispensing tool assembly 10 comprising a generally oval upper body 12 having a top end closed by a manifold 14 secured to the body by a series of four irregularly spaced manifold screws 16. The bottom end of the upper body 12 is covered or closed by a closure member 18 by four symmetrically spaced closure member screws 21.

Figure 3:
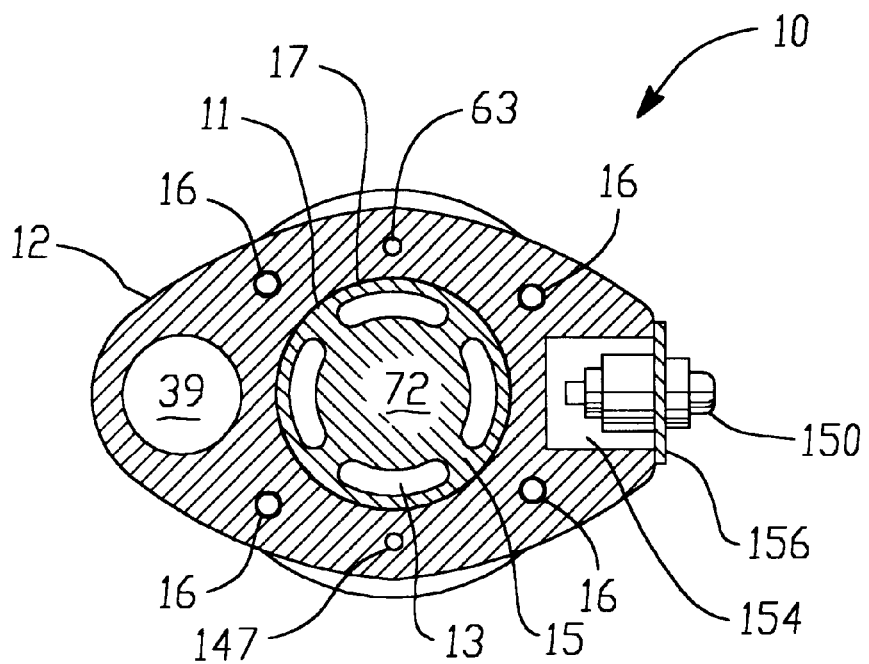
FIG. 3 is a radial section view taken generally on the line 3—3 of FIG. 1.
Figure 4:
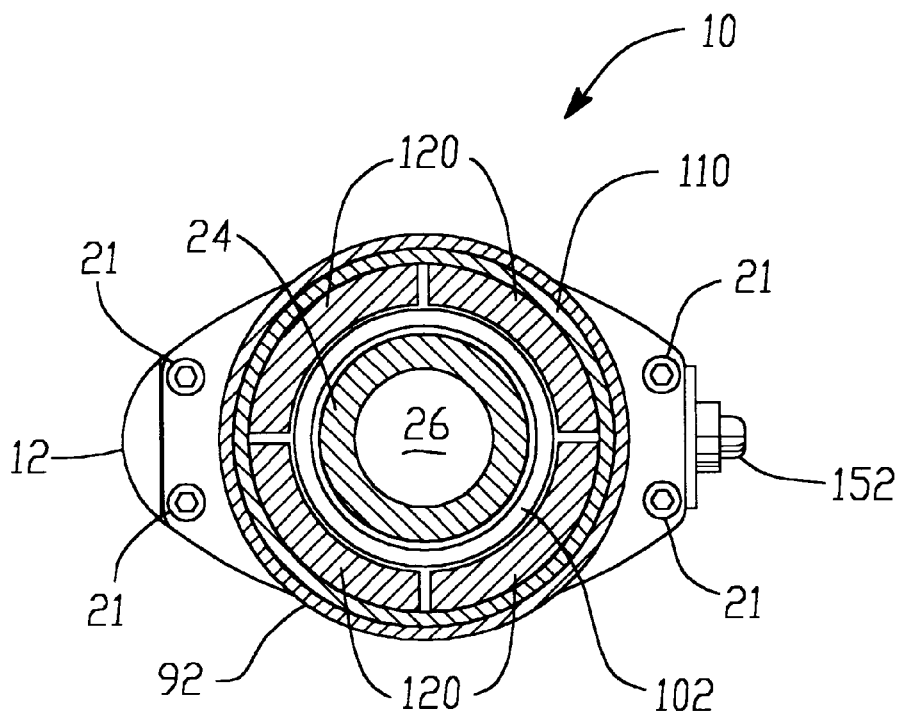
FIG. 4 is a radial section view taken generally on the line 4—4 of FIG. 1.

Referring to FIGS. 3–4, the tool assembly 10 has an obturator 11 having a common axis with an outlet tube 24 defining a cylindrical outlet passage 26. The obturator 11 has four arcuate passageways 13 and four spokes 15.

Figure 6:
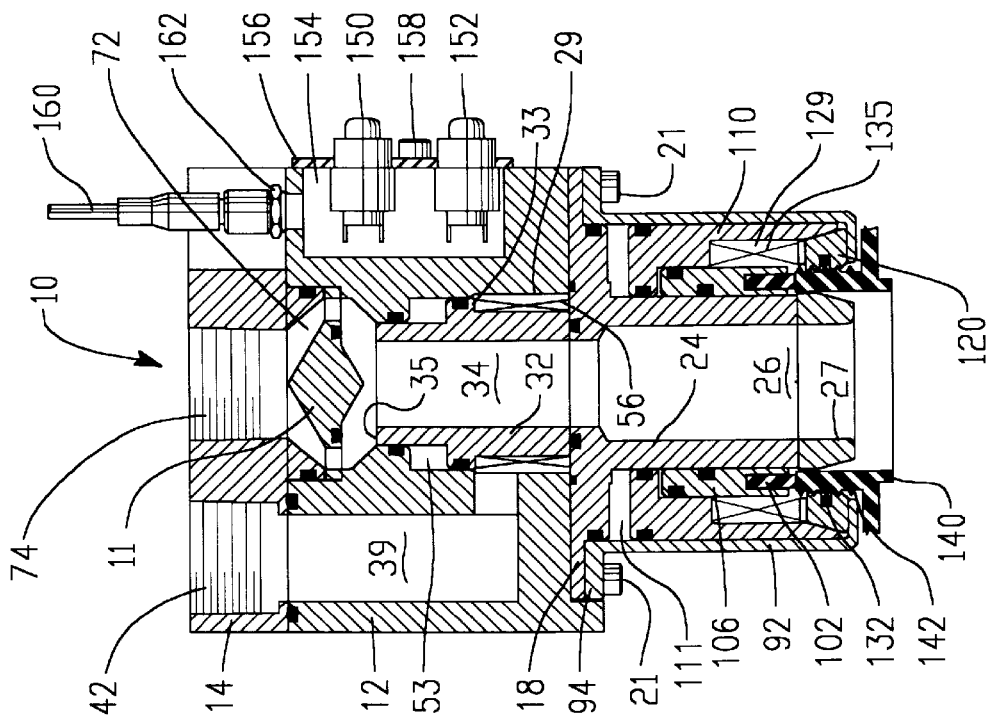
FIG. 6 is a section view taken generally on the line 6—6 of FIG. 2.
Figure 5:
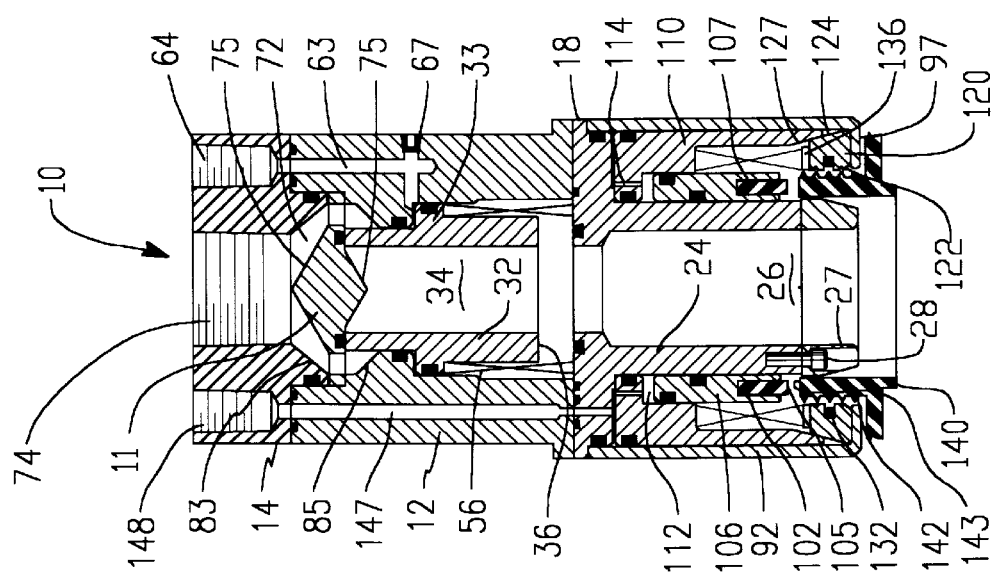
FIG. 5 is a section view taken generally on the line 5—5 of FIG. 2.

Referring to FIGS. 5–6, the body 12 has a stepped cylindrical bore 29 which contains a stepped cylindrical valve member 32 sharing a common axis with the cylindrical bore 29. The valve member 32 is permitted to move axially between an evacuated position (FIG. 5) and a charging position (FIG. 6). The valve member 32 has an axially extending fluid passage 34 which aligns with the outlet passage 26 of the outlet tube 24 and the obturator 11. The valve member 32 has a top end 35 and a bottom end 36 which alternately seal against o-rings in the obturator 11 and closure member 18. A suction passage 39 extends upwardly to an internally threaded suction port 42 within the manifold 14, and the port 42 is adapted to receive a flexible vacuum or suction line (not shown) from a vacuum pump (not shown).

The valve member 32 contains an integral annular piston 33 constrained for axial movement within a cylindrical chamber 53 for the purpose of shuttling the valve member 32 between the vacuum state (FIG. 5) and the fluid charge state (FIG. 6). A compression spring 56 is located below the piston 33 portion of the valve member 32 and within the stepped cylindrical bore 29, and acts to force the valve member 32 toward the manifold 14. An air passage 63 (FIG. 5) extends from the upper end of the chamber 53 (FIG. 6) to a threaded air port 64 of the manifold 14 for the purpose of moving the valve member 32 in a downwardly direction. The air port 64 connects with a flexible pressurized air supply line (not shown). A plug 67 or "Lee Plug" closes the outer end of a radially extending portion of the air passage 63.

Referring to FIGS. 5 and 6, an axially aligned fluid supply passage 72 is also formed within the body 12 and has an upper end connected to a threaded fluid port 74 formed within the manifold 14. The port 74 connects with a flexible fluid supply line (not shown) extending from a fluid or liquid supply source such as a pressurized source of a glycol-water coolant mixture (not shown). The manifold 14 has a tapered or frusto-conical surface 83 in the vicinity of the obturator 11. The body 12 has a tapered surface 85 also in the vicinity of the obturator 11. The obturator 11 is concentrically aligned with the supply passage 72 and has upper and lower tapered surfaces 75. These surfaces (75, 83, and 85) smooth the flow path of the fluid during the charge state.

FIG. 3 depicts one embodiment of the present invention in which the passageways 13 of the obturator 11 have a combined cross-sectional area greater than the cross-sectional area of the fluid passage 34 of the valve member 32. The spokes 15 connect the island-like conical center of the obturator 11 to an integral annular clamping ring 17, which restrains the obturator 11 between the manifold 14 and the body 12. The lower side of the obturator 11 contains an internal groove for retaining a resilient o-ring. This o-ring contacts the top end 35 (FIG. 6) of the valve member 32 when the valve member moves upwardly to a fluid closed position (FIG. 5) in response to the force exerted by the compression spring 56, thus preventing the flow of fluid through the arcuate passageways 13 of the obturator 11.

When the valve member 32 is in the closed, or vacuum position (FIG. 5), the suction passage 39 (FIG. 6) is connected to the outlet passage 26 and the fluid supply passage 72 is closed by the interface of the valve member 32 and the obturator 11. When the valve member 32 is shifted to its retracted or lower position (FIG. 6) in response to pressurized air on the top of the piston 33 of the valve member 32, the suction passage 39 is closed by the interface of the bottom end 36 (FIG. 5) of the valve member 32 and the top end of the closure member 18, and the fluid supply passage 72 is connected with the outlet passage 26. Fluid tight sealing between the valve 32 and the closure member 18 is accomplished by a resilient o-ring installed in an annular groove in the closure member 18.

Referring to FIGS. 5 and 6, a generally cylindrical lower body 92 forms an extension of the body 12 and includes an outwardly projecting upper flange 94 which is secured to the body 12 by the four screws 21 which also secure the closure member 18 to the body. The lower body 92 surrounds the outlet tube 24 and includes an inwardly projecting bottom or lower flange 97. A cylindrical or tubular inner piston 106 is mounted on the outlet tube 24 for axial movement, and contains a resilient annular sealing tube or member 102 in an annular cavity 107 at the lower end of the piston 106. This sealing member 102 has a lower end 105 (FIG. 5) which is aligned to contact an upper surface 143 of an inlet fitting 140. An annular outer piston 110 is supported for axial movement within an annular outer chamber 111 defined between the lower body 92 and the outlet tube 24 and cooperates with the outlet tube 24 to define an annular inner chamber 112 for receiving the inner piston 106. Two axially extending bleed air ports 114 (FIG. 5) connect the inner chamber 112 to the outer chamber 111 which receives the outer piston 110. An annular lock ring 27 is secured to the lower end of the outlet tube 24 by three screw 28 and retains the inner piston 106 from over-travel in the event the chambers 111 and 112 are pressurized when the tool assembly 10 is not connected to the inlet fitting 140.

A set of four arcuate gripping jaws or collar sections 120 are supported by the lower flange 97 of the lower body 92 for movement in corresponding radial directions. Each of the collar sections 120 has internal threads 122 (FIG. 5), and the threads on each section mate with the threads on the adjacent sections so that the four sections form one continuous helical thread when the sections are moved inwardly to a gripping position as shown in FIG. 6.

Each of the arcuate collar sections 120 has a tapered outer surface 124 which mates with a tapered annular surface 127 (FIG. 5) on a lower annular portion of the outer piston 110. A spring wire expansion spring 132 urges the collar sections 120 radially outward against the lower body 92. A compression spring 135 is confined within a spring chamber 129 defined between the outer piston 110 and the inner piston 106. The lower end of the spring 135 seats upon a flat annular washer 136 (FIG. 5) which engages the top surfaces of the collar sections 120. As shown in FIGS. 5 and 6, a series of resilient o-rings form fluid-tight seals between the inner piston 106, the outer piston 110, the inner surface of the lower body 92, the closure member 18 and the outer surface of the outlet tube 24.

Referring to FIG. 6, operation of the tool 10 is controlled by a start button 150 and reset button 152 located within a rectangular chamber 154 of the upper body 12. The buttons 150 and 152 are secured to the body 12 by a plate 156 and two attach screws 158. Signals are sent from the buttons 150 and 152 via an electrical cable 160 which attaches to an electrical connector 162. Wiring (not shown) from the buttons 150, 152 attaches to the connector 162. The electrical cable 160 can be disconnected from the connector 162 to allow quick change of the tool 10 by removing the manifold attach screws 16 (FIG. 2). These components are non-essential to the tool assembly 10, and may not be installed in some embodiments of the invention.

When it is desired to use the dispensing tool assembly 10 to evacuate a fluid system, such as an engine cooling system (not shown) comprising an inlet fitting 140 (FIGS. 5 and 6) having external threads 142, the tool assembly 10 is centered over the inlet fitting 140 and lowered until the lower flange 97 of the lower body 92 rests on the inlet fitting 140. The lower end 105 of the sealing member 102 is aligned for engagement with the upper surface 143 of the inlet fitting 140 by the close fit of the lock ring 27 to the inner surface of the fitting 140. In this position, the arcuate clamping jaws or collar sections 120 are retracted outwardly by the expansion spring 132, as shown in FIG. 5.

Pressurized air is then supplied to the outer chamber 111 through an air passage 147 (FIG. 5) extending through the body 12 from an internally threaded air port 148 (FIG. 2) formed within the manifold 14 and connected to a source of pressurized air. The pressurized air within the outer chamber 111 on top of the outer piston 110 moves the piston downwardly so that the collar sections 120 are cammed inwardly until the internal threads 122 on the collar sections 120 engage the external threads 142 on the inlet fitting 140. This forms a positive coupling of the tool assembly 10 to the inlet fitting 140.

The pressurized air within the outer chamber 111 also passes through the bleed ports 114 and into the inner chamber 112, thus forcing the inner piston 106 downwardly to compress the lower end 105 of the resilient sealing member 102 contained within the inner piston 106 axially against the upper surface 143 of the inlet fitting 140. The cooling system is then evacuated by partial vacuum or suction within the passages 26 and 39. After the evacuation, pressurized air is introduced into the top of the chamber 53 through the passage 63 in order to pressurize the top surface of the annular piston 33. This moves the valve member 32 downwardly against the compression spring 56 so that the suction passage 39 is closed and the fluid supply passage 72 is open to the outlet passage 26 (FIG. 6). After a predetermined volume of the liquid coolant is suppied to the fluid receiving or cooling system, the chamber 53 is exhausted and the valve member 32 returns to the normal evacuation position shown in FIG. 5, thereby closing the fluid supply passage 72 to the outlet passage 26. The pressurized air passage 147 and outer chamber 111 are exhausted so that the air pressure on the inner piston 106 and the outer piston 110 is released. The pistons then return to their upper retracted positions with the aid of the compression spring 135. The tool assembly 10 is thereby uncoupled from the inlet fitting 140, and may be automatically or manually removed from the fitting 140.

From the drawings and the above description, it is apparent that a dispensing tool assembly constructed in accordance with the invention provides features and advances more desirable than the previous invention disclosed in the '407 patent. For example, the obturator 11 incorporating the arcuate passageways 13 minimize flow turning of the fluid during charging, thus increasing flow rate and decreasing charge time. Containing the sealing member 102 within the lower end of the piston 106 allows for an increase in the diameter of the outlet passage 26, and thus promotes an increase in flow rate over the '407. In addition, sticking of the sealing member to the inlet fitting 140 during clamp release is eliminated. The decreased length of the outlet tube 24 allows it to be fully protected by the lower body 92 during handling and allows for greater angulation of the tool assembly 10 about the fitting 140, which is critical for automatic retraction. The tool assembly 10 offers a reduction in the number of essential components due to the use of a single compression spring 135 and the consolidation of the piston 33 into the valve member 32.

The invention is not limited to the above preferred embodiments and various modifications thereof may be made without departing from the spirit and scope of the invention. Rather, the scope of the invention is defined by the appended claims.

What is claimed is:

1. A dispensing tool assembly for connecting a fluid charging unit to a liquid receiving system having a tubular inlet fitting with upper inner and outer surfaces, said tool assembly comprising a body having a center axis and means forming an axially extending outlet tube defining an outlet passage, said body defining a suction passage for evacuating the system and a fluid supply passage for filling the system, said outlet passage mounting an inner fluid actuated piston further mounting a resilient annular sealing member and movable axially between a retracted position and an extended position for engaging the upper planar surface of the inlet fitting, said tool assembly comprising gripping means disposed around said outlet tube and supported for generally radial movement between an inward gripping position engaging the outer surface of the inlet fitting and a retracted released position, said tool assembly comprising movable valve means within said body for selectively connecting said suction passage and said fluid supply passage to said outlet passage, said tool assembly comprising means forming a streamlined obturator for selective sealing engagement with said valve means, said tool assembly comprising means including an outer fluid actuated piston positioned for moving said gripping means between said gripping and released positions in response to axial movement of said outer piston, and means defining passages within said body for directing pressurized fluid to said outer and inner pistons.

2. A tool assembly as defined in claim 1 wherein said outer piston surrounds said inner piston and receives said inner piston for relative axial sliding movement.

3. A tool assembly as defined in claim 1 wherein said gripping means comprise a plurality of circumferentially disposed arcuate gripping elements, and cam means on said outer piston for moving said gripping elements inwardly to said gripping position in response to axial movement of said outer piston.

4. A tool assembly as defined in claim 1 wherein said gripping means comprise gripping elements having internal threads for engaging external threads on the outer surface of the inlet fitting.

5. A tool assembly as defined in claim 1 wherein said movable valve means within said body comprises a tubular valve member supported for axial movement in alignment with said outlet tube and defining a passage, said valve means comprises an annular fluid actuated piston integral to said valve member, and said valve member is positioned for alternately opening and closing said suction passage and said fluid supply passage.

6. A tool assembly as defined in claim 1 wherein said suction passage is spaced axially within said body, said fluid passage is in axial alignment with said outlet tube, and said valve means comprise a tubular valve member supported for axial movement within said body between a first position closing said fluid supply passage and connecting said suction passage to said outlet passage and a second position closing said suction passage and connecting said fluid supply passage to said outlet passage.

7. A tool assembly as defined in claim 1 wherein said obturator is in axial alignment with said movable valve means, said obturator comprises an upper conical surface, a plurality of circumferentially disposed passageways for flow of said fluid, and a plurality of circumferentially disposed spokes.

8. A tool assembly as defined in claim 7 wherein said passageways are arcuate in shape.

9. A tool assembly as defined in claim 1 wherein said outer piston and said gripping means are urged to said released position by a compression spring axially aligned with said outer piston.

10. A tool assembly as defined in claim 1 wherein said gripping means have internal threads for engaging external threads on the outer surface of the inlet fitting.

11. A tool assembly as defined in claim 1 wherein said valve means comprise a tubular valve member supported for axial movement within said body between a first position closing said fluid supply passage and connecting said suction passage and a second position closing said suction passage and connecting said fluid supply passage to said outlet passage.

12. A tool assembly as defined in claim 1 wherein said obturator defines a valve seat for receiving an end surface of said valve member.

13. A dispensing tool assembly for connecting a fluid charging unit to a liquid receiving system having an inlet fitting with an upper surface, said tool assembly comprising a body having a center axis and including a portion forming an axially extending outlet passage, said outlet passage mounting an inner fluid actuated piston further mounting a resilient annular selling member in alignment with the upper surface of said inlet fitting and movable axially between a retracted position and an extended position for engaging the upper surface of said inlet fitting, said tool assembly comprising gripping means disposed around said body portion and supported for generally radial movement between an inward gripping position engaging the inlet fitting and a retracted released position, said body defining a suction passage for evacuating the system and a fluid supply passage for filling the system said tool assembly comprising means forming a tubular valve member within said body and defining a center passage in axial alignment with said outlet passage, said valve member supported by said body for axial movement between a first position closing said fluid supply passage and connecting said suction passage to said outlet passage and a second position closing said suction passage and connecting said fluid supply passage to said outlet passage, said tool assembly comprising means forming a streamlined obturator concentrically supported within said fluid supply passage and positioned in axial alignment with said valve member for selective sealing engagement with said valve member, means including a first fluid actuated piston positioned for moving said gripping means between said gripping and released positions in response to axial movement of said first piston, means including a second fluid actuated piston integral to said valve member for moving said valve member between said first and second positions in response to axial movement of said second piston, and means defining passages within said body for directing pressurized fluid to said first and second pistons.

14. A tool assembly as defined in claim 13 and including an annular collar secured to said outlet tube for restraining said inner piston from over-travel.

15. A tool assembly as defined in claim 13 wherein said obturator defines a valve seat for receiving an end surface of said valve member.

16. A tool assembly as defined in claim 13 wherein said obturator comprises an upper conical surface, a plurality of circumferentially disposed passageways for flow of said fluid, and a plurality of circumferentially disposed spokes spaced intermediate said passageways.

17. A tool assembly as defined in claim 13 wherein said gripping means have internal threads for engaging external threads on the outer surface of the inlet fitting.

18. A dispensing tool assembly for connecting a fluid charging unit to a liquid receiving system having a tubular inlet fitting with inner and outer surfaces, said tool assembly comprising a body having a center axis and means forming an axially extending outlet tube defining an outlet passage, said body defining a suction passage for evacuating the system and a fluid supply passage for filing the system, said tool assembly comprising means forming a movable valve member within said body for selectively connecting said suction passage and said fluid supply passage to said outlet passage, said tool assembly comprising means forming a streamlined obturator concentrically supported within said fluid supply passage and positioned in axial alignment with said valve member and said outlet tube for selective sealing engagement with said valve member, said valve member comprising a fluid actuated piston integral to said valve member for moving said valve member in response to axial movement of said piston, and means defining passages within said body for directing pressurized fluid to said piston.

19. A dispensing tool assembly for connecting a fluid charging unit to a liquid receiving system having a tubular inlet fitting, said dispensing tool assembly comprising:

a body including a bore defining a fluid supply passage for filling the system and a center axis, said body further defining a suction passage for evacuating the system;

an axially extending outlet tube defining an outlet passage, said outlet passage aligned coaxially with said fluid supply passage;

a movable valve member supported for axial movement within said body for selectively connecting said suction passage and said fluid supply passage to said outlet passage;

an obturator concentrically supported within said bore of said body and positioned in axial alignment with said movable valve member for sealing said fluid supply passage from fluid communication with said outlet passage; and wherein said obturator includes an upper surface, a plurality of circumferentially spaced passageways formed within said upper surface, and a plurality of circumferentially spaced spokes positioned intermediate said passageways.

20. The dispensing tool assembly as defined in claim 19 wherein said obturator further includes upper and lower tapered surfaces and said body includes a bore tapered surface substantially aligned with said lower tapered surface of said obturator.

* * * * *